(12) United States Patent
Nakai

(10) Patent No.: US 9,722,259 B2
(45) Date of Patent: Aug. 1, 2017

(54) CERAMIC SUBSTRATE FOR ELECTROCHEMICAL ELEMENT, MANUFACTURING METHOD THEREFORE, FUEL CELL, AND FUEL CELL STACK

(71) Applicant: Murata Manufacturing Co., Ltd., Nagaokakyo-shi, Kyoto-fu (JP)

(72) Inventor: Hideaki Nakai, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/991,109

(22) Filed: Jan. 8, 2016

(65) Prior Publication Data

US 2016/0126564 A1    May 5, 2016

Related U.S. Application Data

(63) Continuation of application No. PCT/JP2014/068778, filed on Jul. 15, 2014.

(30) Foreign Application Priority Data

Aug. 21, 2013    (JP) .................................. 2013-171371

(51) Int. Cl.
    *H01M 8/02*    (2016.01)
    *H01M 8/0215*    (2016.01)
    (Continued)

(52) U.S. Cl.
    CPC ............ *H01M 8/0215* (2013.01); *B32B 18/00* (2013.01); *H01M 8/0228* (2013.01);
    (Continued)

(58) Field of Classification Search
    CPC ............. H01M 8/0215; H01M 8/0217; H01M 2008/1293; Y02E 60/525; Y02E 60/50; Y02P 70/56
    See application file for complete search history.

(56) References Cited

U.S. PATENT DOCUMENTS

2005/0089739 A1*    4/2005    Seccombe, Jr. ...... H01M 4/9066
                                                              429/482
2009/0169958 A1    7/2009    Lin
(Continued)

FOREIGN PATENT DOCUMENTS

EP         1433767 A1    6/2004
JP     H06-68885 A    3/1994
(Continued)

OTHER PUBLICATIONS

International Search Report issued for PCT/JP2014/068778, date of mailnig Oct. 21, 2014.
(Continued)

Primary Examiner — Stewart Fraser
(74) Attorney, Agent, or Firm — Arent Fox LLP

(57) ABSTRACT

A ceramic substrate for an electrochemical element that includes a ceramic layer and a high-thermal-expansion-coefficient material layer that is laminated on the surface of the ceramic layer. The high-thermal-expansion-coefficient material layer has a higher coefficient of thermal expansion than the ceramic layer, and applies compressive stress to the ceramic layer.

20 Claims, 5 Drawing Sheets

(51) Int. Cl.
  *B32B 18/00* (2006.01)
  *H01M 8/0228* (2016.01)
  *H01M 8/0217* (2016.01)
  *H01M 8/124* (2016.01)
  *H01M 2/14* (2006.01)
  *H01M 2/16* (2006.01)

(52) U.S. Cl.
  CPC .......... *H01M 2/145* (2013.01); *H01M 2/1646* (2013.01); *H01M 2/1686* (2013.01); *H01M 8/0217* (2013.01); *H01M 2008/1293* (2013.01); *Y02P 70/56* (2015.11)

(56) References Cited

U.S. PATENT DOCUMENTS

2011/0111320 A1  5/2011  Suda et al.
2013/0108943 A1* 5/2013  Yamanis ............. H01M 8/0206
                                                            429/482
2013/0137014 A1  5/2013  Lin
2014/0017597 A1  1/2014  Yokokura
2014/0134513 A1  5/2014  Nakamura et al.
2016/0072147 A1  3/2016  Nakamura et al.

FOREIGN PATENT DOCUMENTS

JP    H11-273699 A      10/1999
JP    2003-303603 A     10/2003
JP    2009-295497 A     12/2009
WO    WO 2008/044429 A1  4/2008
WO    WO 2009/119771 A1 10/2009
WO    WO 2012/133176 A1 10/2012
WO    WO 2013012009 A1   1/2013

OTHER PUBLICATIONS

Written Opinion of the International Searching Authoritiy issued for PCT/JP2014/068778, date of mailing Oct. 21, 2014.

* cited by examiner

CERAMIC SUBSTRATE FOR ELECTROCHEMICAL ELEMENT, MANUFACTURING METHOD THEREFORE, FUEL CELL, AND FUEL CELL STACK

CROSS REFERENCE TO RELATED APPLICATIONS

The present application is a continuation of International application No. PCT/JP2014/068778, filed Jul. 15, 2014, which claims priority to Japanese Patent Application No. 2013-171371, filed Aug. 21, 2013, the entire contents of each of which are incorporated herein by reference.

FIELD OF THE INVENTION

The present invention relates to a ceramic substrate for use in, e.g., a separator of an electrochemical element such as a fuel cell, a method for manufacturing the ceramic substrate, and a fuel cell and a fuel cell stack including the ceramic substrate.

BACKGROUND OF THE INVENTION

Conventionally, various electrochemical elements including ceramic substrates have been developed. For example, Patent Document 1 below discloses a solid oxide fuel cell that uses a solid oxide electrolyte. In this fuel cell, the solid oxide electrolyte, separator, etc. constituting a cell of the fuel cell are formed from ceramics.

Patent Document 1: WO 2008/044429

SUMMARY OF THE INVENTION

Ceramic substrates for use in, e.g., separators in conventional electrochemical elements have the problem of low toughness, although the compressive strength is high. Therefore, there has been a problem that breakages due to thermal stress or mechanical stress are likely to be caused.

An object of the present invention is to provide a ceramic substrate for an electrochemical element, which is unlikely to be broken when thermal stress or mechanical stress is applied, and a method for manufacturing the ceramic substrate.

Another object of the present invention is to provide a fuel cell and a fuel cell stack that include the ceramic substrate for an electrochemical element.

A ceramic substrate for an electrochemical element according to the present invention includes: a ceramic layer; and a high-thermal-expansion-coefficient material layer laminated on the surface of the ceramic layer, which has a higher coefficient of thermal expansion than the ceramic layer. In the present invention, compressive stress from the high-thermal-expansion-coefficient material layer is applied to the ceramic layer.

In a particular aspect of the ceramic substrate for an electrochemical element according to the present invention, the difference in coefficient of thermal expansion is 3 ppm or less between the ceramic layer and the high-thermal-expansion-coefficient material layer.

In other aspect of the ceramic substrate for an electrochemical element according to the present invention, the high-thermal-expansion-coefficient material layer is composed of a ceramic material containing lanthanum manganite as its main constituent.

In another aspect of the ceramic substrate for an electrochemical element according to the present invention, the high-thermal-expansion-coefficient material layer is a porous body.

In another particular aspect of the ceramic substrate for an electrochemical element according to the present invention, the ceramic substrate for electrochemical element is a separator of an electrochemical element.

In other particular aspect of the ceramic substrate for an electrochemical element according to the present invention, the ceramic layer is a sheet-like ceramic layer.

A method for manufacturing the ceramic substrate for an electrochemical element according to the present invention includes the steps of: preparing the ceramic layer; and integrating, on the surface of the ceramic layer, a high-thermal-expansion-coefficient material layer that has a higher coefficient of thermal expansion than the ceramic layer so that compressive stress is applied to the ceramic layer.

In a particular aspect of the method for manufacturing a ceramic substrate for an electrochemical element according to the present invention, the high-thermal-expansion-coefficient material layer is composed of a ceramic that has, after firing, a higher coefficient of thermal expansion than the ceramic layer, and the firing ceramic material constituting the high-thermal-expansion-coefficient material layer is laminated on the ceramic layer, and subjected to firing to integrate the high-thermal-expansion-coefficient material layer onto the ceramic layer.

A fuel cell according to the present invention includes a separator and a cell of a fuel cell, and the separator is composed of the ceramic substrate for an electrochemical element, which is configured in accordance with the present invention.

A fuel cell stack according to the present invention includes a plurality of cells of fuel cells stacked, and further includes a separator disposed between the cells of fuel cells stacked, and the separator is composed of the ceramic substrate for an electrochemical element, which is configured in accordance with the present invention.

In the ceramic substrate for an electrochemical element according to the present invention, the strength of the ceramic layer is enhanced because compressive stress from the high-thermal-expansion-coefficient material layer is applied to the ceramic layer. Therefore, even when thermal stress or mechanical stress is applied, the ceramic substrate for an electrochemical element is unlikely to be broken.

Accordingly, a fuel cell or a fuel cell stack that uses the ceramic substrate for an electrochemical element according to the present invention makes it possible to ensure that breakages due to thermal stress or the like are suppressed during manufacture or during use.

DETAILED DESCRIPTION OF THE INVENTION

The present invention will be demonstrated by describing specific embodiments of the present invention with reference to the drawings.

Figure 1:
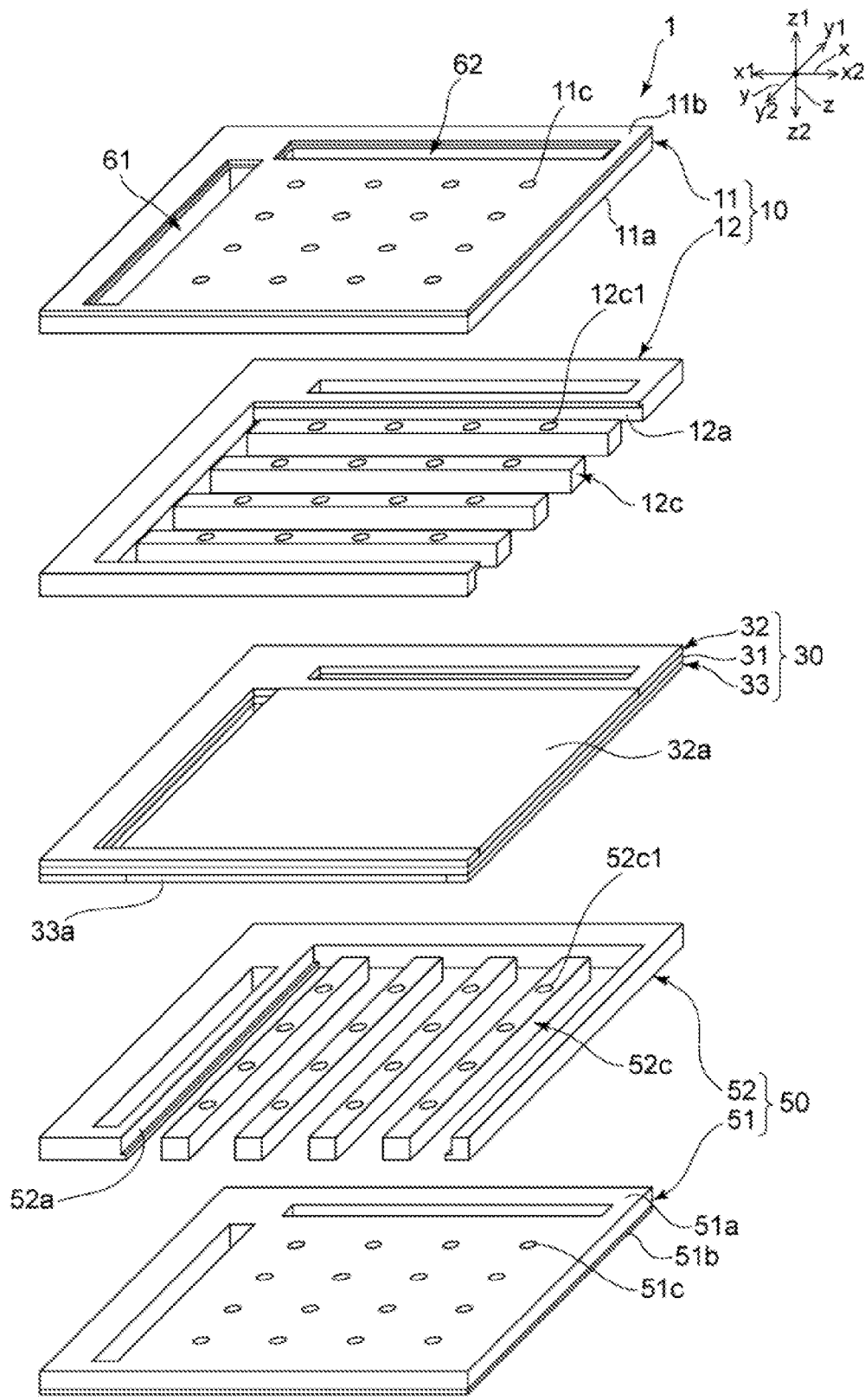
FIG. 1 is an exploded perspective view of a fuel cell according to a first embodiment of the present invention.
Figure 2:
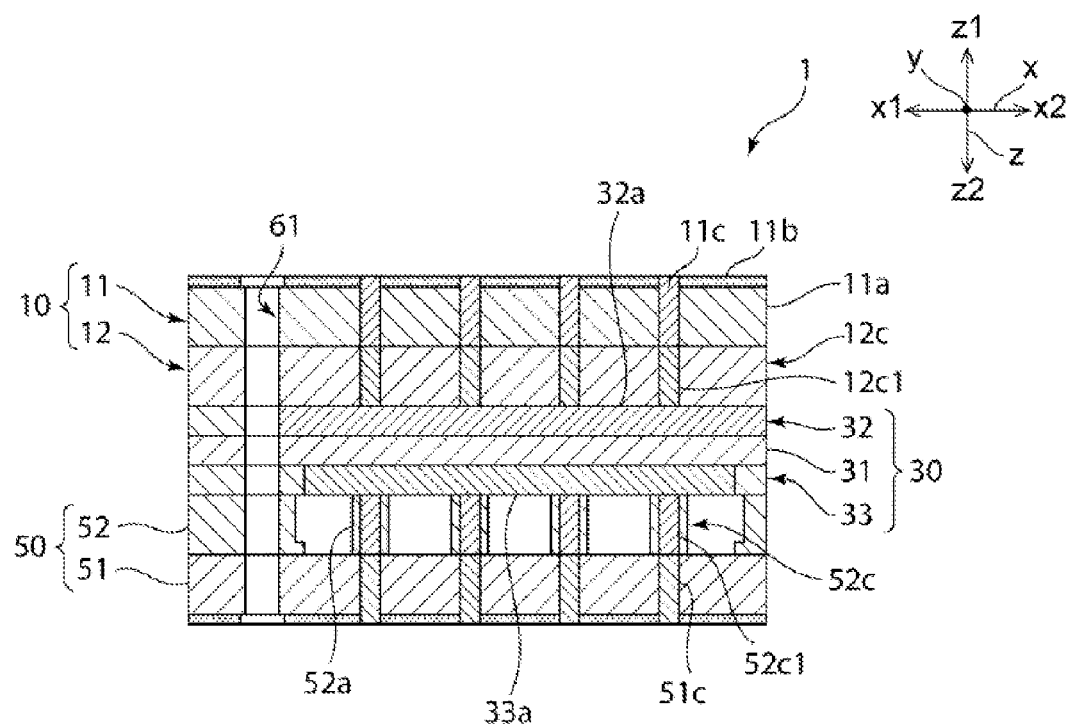
FIG. 2 is a front cross-sectional view of the fuel cell according to the first embodiment of the present invention.

FIG. 1 is an exploded perspective view of a fuel cell according to a first embodiment of the present invention, and FIG. 2 is a front cross-sectional view thereof.

As shown in FIGS. 1 and 2, the solid oxide fuel cell 1 according to the present embodiment includes a first separator 10, a power generation element 30, and a second separator 50. The first separator 10, the power generation element 30, and the second separator 50 are laminated in this order as shown.

In the fuel cell 1 according to the present embodiment, the first separator body 11 and second separator body 51 are composed of a ceramic substrate for an electrochemical element as an embodiment of the present invention.

The first separator 10 has the first separator body 11 and a first flow path formation member 12. The first flow path formation member 12 has an oxidant gas flow path 12a formed for supplying air as an oxidant gas. The oxidant gas flow path 12a is partitioned by a plurality of separation parts 12c extending in the x direction. The upper surfaces of the respective flow path parts partitioned are closed by the first separator body 11. On the other hand, the first separator body 11 and the separation parts 12c have via hole electrodes 11c, 12c1 formed. The via hole electrodes 11c and the via hole electrodes 12c1 are provided to overlap with each other.

The first separator body 11 is provided with a slit 61 for the exit of an oxidant gas and a slit 62 for the passage of a fuel gas.

In this regard, the first separator body 11 includes a ceramic substrate for an electrochemical element as an embodiment of the present invention. More specifically, the first separator body 11 has a ceramic layer 11a, and a high-thermal-expansion-coefficient material layer 11b provided on one side of the ceramic layer 11a. The ceramic layer 11a can be formed from stabilized zirconia such as yttria stabilized zirconia, partially stabilized zirconia, or the like.

Specific examples of stabilized zirconia include 10 mol % yttria stabilized zirconia (10YSZ) and 11 mol % scandia stabilized zirconia (11ScSZ). Specific examples of partially stabilized zirconia include 3 mol % yttria partially stabilized zirconia (3YSZ). In addition, the ceramic layer 11a may be formed from, for example, alumina or $MgAl_2O_4$.

On the other hand, the high-thermal-expansion-coefficient material layer 11b can be formed from an appropriate material that is higher in coefficient of thermal expansion than the ceramic layer 11a. As such a material, for example, various ceramic materials can be used in a preferred manner. The materials can include, for example, LSM as a lanthanum-manganite based material, LSCF as a lanthanum-cobaltite based material, and gadolinium doped ceria (GDC).

Figure 3:
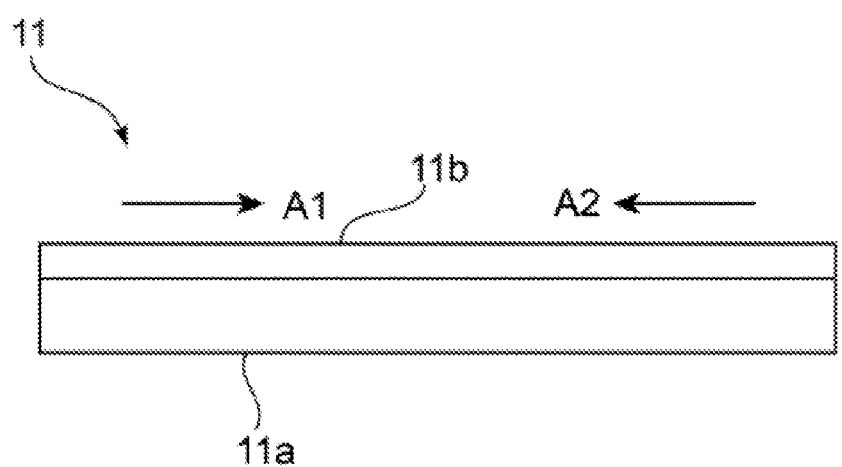
FIG. 3 is a side view of a ceramic substrate as a separator for use in the fuel cell according to the first embodiment of the present invention.

In the case of the first separator body 11, the high-thermal-expansion-coefficient material layer 11b is laminated on one side of the ceramic layer 11a as shown in FIG. 3. The high-thermal-expansion-coefficient material layer 11b is laminated on the ceramic layer 11a so that compressive stress indicated by arrows A1 and A2 in the high-thermal-expansion-coefficient material layer 11b is applied to the ceramic layer 11a. This structure can be obtained by, for example, the following method.

First, a ceramic green sheet for the ceramic layer 11a is prepared. On one side of the ceramic green sheet, another ceramic green sheet for forming the high-thermal-expansion-coefficient material layer 11b is laminated, and subjected to pressure bonding. Then, firing by heating can provide the high-thermal-expansion-coefficient material layer 11b and the ceramic layer 11a, and apply compressive stress from the high-thermal-expansion-coefficient material layer 11b to the ceramic layer 11a. The ceramic undergoes firing shrinkage during the firing. The firing shrinkage in the high-thermal-expansion-coefficient material layer 11b is greater than the firing shrinkage in the ceramic layer 11a. Therefore, compressive stress is applied to the ceramic layer 11a. When the stress from the pressure bonding is applied to the ceramic layer 11a, the mechanical strength of the ceramic layer 11a will be increased.

Accordingly, the fracture toughness of the first separator body 11 and first separator 10 including the first separator body 11 can be enhanced effectively. Therefore, even when thermal stress is applied during manufacture or during use, the breakage of the first separator body 11 and first separator 10, and thus the breakage of the fuel cell 1 can be suppressed effectively.

The second separator 50 also has a structure similar to the first separator 10. More specifically, the second separator 50 has a second separator body 51 and a second flow path formation member 52. The second separator body 51 has a ceramic layer 51a, and a high-thermal-expansion-coefficient material layer 51b provided on the lower surface of the ceramic layer 51a. The ceramic layer 51a is formed in the same way as the ceramic layer 11a described above. The high-thermal-expansion-coefficient material layer 51b is formed in the same way as the high-thermal-expansion-coefficient material layer 11b.

Accordingly, the second separator body 51 is also unlikely to be broken even when thermal stress is applied.

The second flow path formation member 52 has a fuel gas flow path 52a formed which extends in the Y direction. This fuel gas flow path 52a is partitioned by a plurality of separation parts 52c.

The second separator body 51 also has a plurality of via hole electrodes 51c formed. In addition, the separation parts 52c are also provided with a plurality of via hole electrodes 52c1. The via hole electrodes 51c and the via hole electrodes 52c1 are arranged to overlap with each other.

A feature of the fuel cell 1 according to the present embodiment is that the first and second separators 10, 50 have the ceramic layers 11a, 51a and the high-thermal expansion material layers 11b, 51b. Thus, as described above, breakages can be reliably suppressed when thermal stress is applied. The other configuration will be described below with reference to FIGS. 1 and 2.

The power generation element 30 refers to a part where an oxidant gas and a fuel gas react to generate power. Air, an oxygen gas, or the like can be used as the oxidant gas. As well known, hydrogen, carbon monoxide, or the like can be used as the fuel gas.

The power generation element 30 has a solid oxide electrolyte layer 31. The solid oxide electrolyte layer 31 is preferably composed of a highly ion-conductive material.

This solid oxide electrolyte layer 31 can be formed from stabilized zirconia, partially stabilized zirconia, or the like as mentioned previously.

The solid oxide electrolyte layer 31 is sandwiched between an air electrode layer 32 and a fuel electrode layer 33.

The air electrode layer 32 has an air electrode 32a. The air electrode 32a can be formed from scandia stabilized zirconia (ScSZ), Sn-doped indium oxide, $PrCoO_3$-based oxide, or the LSM, LSCF, or LCM as mentioned previously.

The fuel electrode layer 33 has a fuel electrode 33a. The fuel electrode 33a can be formed from, for example, NiO, yttria stabilized zirconia (YSZ), scandia stabilized zirconia (ScSZ), porous cermet of nickel metal, or the like.

Figure 4:
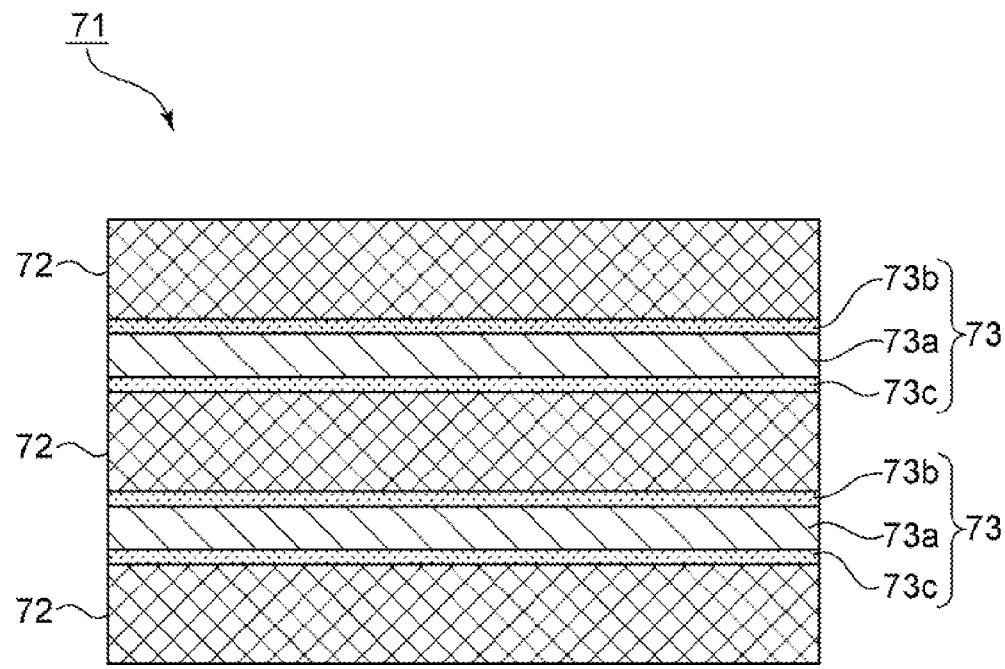
FIG. 4 is a schematic front cross-sectional view for explaining a fuel cell stack as a second embodiment of the present invention.

FIG. 4 is a schematic front cross-sectional view for explaining a fuel cell stack as a second embodiment of the present invention. A fuel cell stack 71 according to the present embodiment has cells 72, 72, 72 of fuel cells stacked with separators 73, 73 interposed therebetween. Each cell 72 of the fuel cell is configured, for example, in the same way as the fuel cell 1 according to the first embodiment. In the present embodiment, the voltage is increased with the plurality of cells 72, 72, 72, of the fuel cells stacked. In this regard, the separator 73 includes a ceramic substrate for an electrochemical element as an embodiment of the present invention. More specifically, high-thermal-expansion-coefficient material layers 73b, 73c are laminated on both sides of a ceramic layer 73a. The high-thermal-expansion-coefficient material layers 73b, 73c are laminated so that compressive stress is applied to the ceramic layer 73a in a planar direction. Accordingly, in the present embodiment, the separator 73 is unlikely to be broken even when thermal stress is applied to the separator 73 during manufacture or during use.

Therefore, the fuel cell stack 71 can be provided which has excellent reliability.

As is clear from the present embodiment, in the present invention, the high-thermal-expansion-coefficient material layers may be formed on both surfaces of the ceramic layer for the ceramic substrate for an electrochemical element. More specifically, the position of the high thermal-expansion-coefficient material layer formed on the surface of the ceramic layer is not particularly limited.

As long as compressive stress is applied to the ceramic layer, the high-thermal-expansion-coefficient material layer may be laminated in any position on the surface of the ceramic layer.

Preferably, the difference in coefficient of thermal expansion is desirably 3 ppm or less between the thermal-expansion-coefficient material layer and the ceramic layer. In such a case, peeling or the like is unlikely to be caused at the interface between the ceramic layer and the high thermal-expansion-coefficient material layer when thermal stress is applied.

Figure 5:
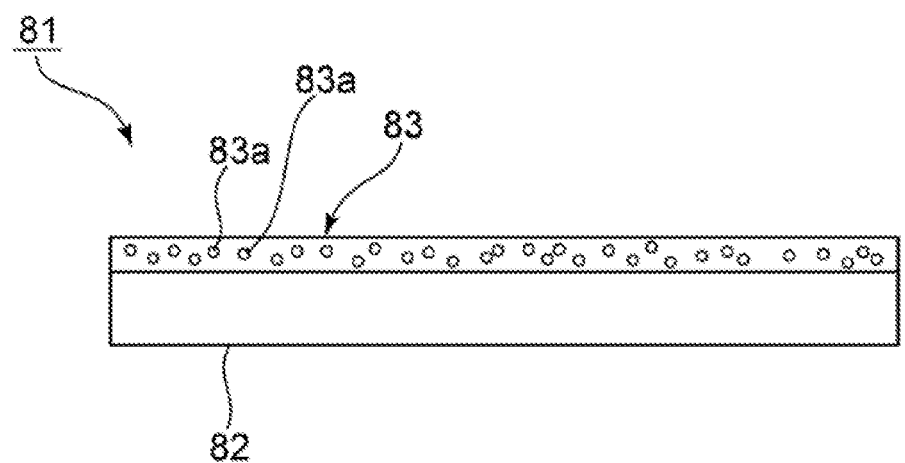
FIG. 5 is a front cross-sectional view illustrating a ceramic substrate for an electrochemical element as a third embodiment of the present invention.

FIG. 5 is a front cross-sectional view illustrating a ceramic substrate for an electrochemical element as a third embodiment of the present invention. A ceramic substrate 81 for an electrochemical element has a high thermal-expansion-coefficient material layer 83 laminated on one side of the ceramic layer 82. The high thermal-expansion-coefficient material layer 83 has a large number of voids 83a in the present embodiment. More specifically, the high thermal-expansion-coefficient material layer 83 is a porous body. The high-thermal-expansion-coefficient material layer 83 is laminated so that compressive stress is applied to the ceramic layer 82. Accordingly, as in the case of the first and second embodiments, breakages are unlikely to be caused when thermal stress is applied.

Additionally, the high-thermal-expansion-coefficient material layer 83 itself is unlikely to be cracked when thermal stress is applied, because the high-thermal-expansion-coefficient material layer 83 is composed of a porous body. Accordingly, the breakage of the ceramic substrate for electrochemical element can be further effectively suppressed when thermal stress is applied. In this case, the porous body is not particularly limited as long as the porous body has a number of the voids 83a, but the porosity is desirably 20% or more. When the porosity is 20% or more, peeling or the like at the interface between the ceramic layer 82 and the high-thermal-expansion-coefficient material layer 83 can be further effectively suppressed.

The high-thermal-expansion-coefficient material layer 83 composed of the porous body can be obtained in accordance with a well-known method for producing a porous ceramic material. Examples of the method include, for example, a method in which a material that is vaporized by firing is dispersed in a high-thermal-expansion-coefficient material, and subjected to firing.

Figure 6:
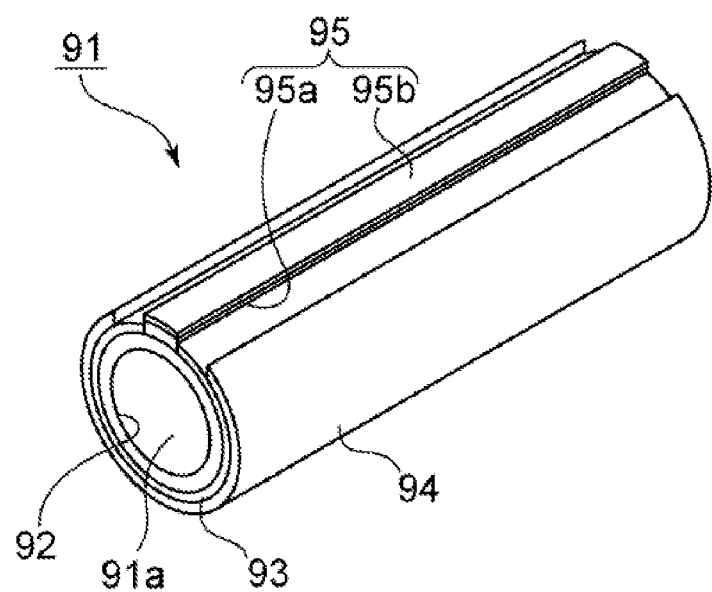
FIG. 6 is a perspective view illustrating a fuel cell as a fourth embodiment of the present invention.
Figure 7:
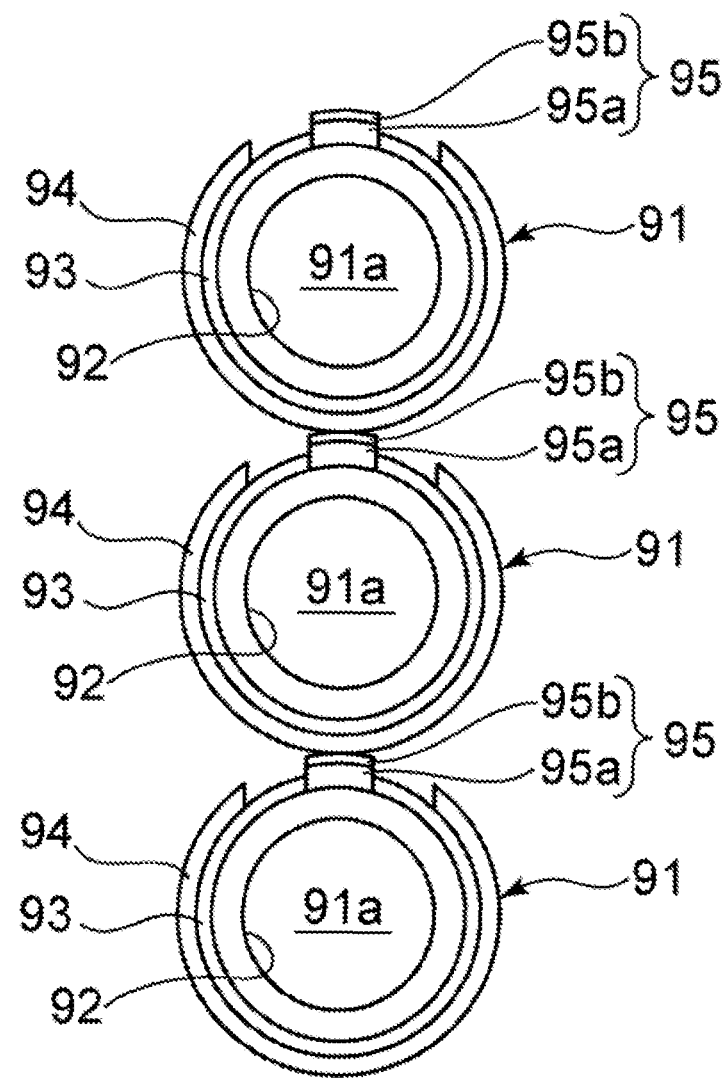
FIG. 7 is a schematic front view illustrating a fuel cell stack obtained by stacking a plurality of fuel cells according to the fourth embodiment of the present invention.

While the ceramic layers have the form of a sheet in the first to third embodiments, the shape of the ceramic layer is not limited to the form of a sheet in the ceramic substrate for an electrochemical element according to the present invention. FIG. 6 is a perspective view illustrating a fuel cell as a fourth embodiment of the present invention, and FIG. 7 is a schematic front view illustrating a fuel cell stack obtained by stacking a plurality of fuel cells according to this embodiment.

A fuel cell 91 shown in FIG. 6 is a fuel cell referred to as a so-called cylindrical SOFC. In this regard, a flow path 91a for the passage of a fuel gas is provided in the center of the cylindrical body. A cylindrical air electrode 92 is provided to surround the flow path 91a. A cylindrical solid oxide electrolyte layer 93 is provided outside the air electrode 92, and a fuel electrode 94 is provided further outside. The fuel electrode 94 has the shape of a cylinder with a portion removed therefrom, and the region of the fuel electrode 94 with the portion removed therefrom is provided with an interconnector 95.

This interconnector 95 has a ceramic layer 95a, and a high-thermal-expansion-coefficient material layer 95b laminated on one side of the ceramic layer 95a. More specifically, the interconnector 95 is composed of a ceramic substrate for an electrochemical element according to the present invention.

As just described, the ceramic substrate for an electrochemical element according to the present invention can be also used for the cylindrical fuel cell 91. In FIG. 7, adjacent fuel cells 91 are stacked one another with such interconnectors 95 interposed therebetween.

It is to be noted that the interconnectors 95 have portions, not shown, provided with electrically conductive paths such as via hole conductors, in order to electrically connect the adjacent fuel cells 91 to each other.

The fuel cell as an embodiment of the present invention is not limited to plate-like laminated and cylindrical forms as described above, but may be, for example, a fuel cell in the form referred to as a flat tube.

It is further noted that while the ceramic substrate for an electrochemical element according to the present invention is used for the separator in fuel cell or fuel cell stack, or the interconnector in the embodiments described above, the ceramic substrate for an electrochemical element according to the present invention can be used as a ceramic material for not only the solid oxide fuel cells, but also various fuel cells, or various electrode chemical elements other batteries such as electric double layer capacitors.

Next, based on specific experimental examples, advantageous effect of the present invention will be demonstrated.

Experimental Example 1

Evaluation of Single Separator

In order to provide the composition of 3 mol % yttria partially stabilized zirconia (3YSZ), a yttrium oxide powder and a zirconia power were weighed, and mixed with a resin binder and a solvent to obtain ceramic slurry. This ceramic slurry was subjected to sheet forming to obtain ceramic green sheets. The ceramic green sheets were laminated more than once so that the thickness after firing was 500 μm. The laminated body thus obtained was cut so that the planar shape was a square of 5 cm×5 cm. The laminated body thus obtained was subjected to firing for 2 hours at a temperature of 1300° C. to obtain a separator according to a comparative example.

In examples, a green sheet for a high-thermal-expansion-coefficient material layer with its composition shown in Table 1 below was laminated on the front and back surfaces of the laminated body. This green sheet for a high-thermal-expansion-coefficient material layer was obtained in a way that various types of oxide powders were weighed so as to provide the composition shown in Table 1 below, and mixed with a carbon powder, a resin binder, and a solvent, and the obtained slurry was subjected to sheet forming. The carbon powder was blended so that the porosity of the fired high-thermal-expansion-coefficient material layer was 20 to 30%.

From the standpoint of manufacture, the green sheet for a high-thermal expansion-coefficient material layer was cut so that the size after firing was a square of 4.5 cm×4.5 cm in planar shape. The cut green sheet for a high-thermal-expansion-coefficient material layer was subjected to pressure bonding for 2 minutes at a temperature of 80° C. onto the laminated body. Then, the laminated body with the green sheet thereon was subjected to firing by keeping the body at a temperature of 1300° C. for 2 hours.

The separators according to Comparative Example and Examples 1 to 5 as shown in Table 1 below were obtained in the way described above. For each of the respective separators, the appearance was visually observed to confirm whether the separator was cracked or broken, and warped or not. The results are shown in Table 1 below.

The separator cracked or broken, or warped was rejected. The separators which were not found to be cracked, broken, or warped are listed with a symbol of ⊙ in Table 1 below.

In addition, for the samples which were not warped, in accordance with JIS R1061, samples for the measurement of flexural strength were prepared, and the flexural strength was measured. It is to be noted that in regard to the preparation of the samples, the sample thicknesses were just adjusted to 500 μm+100 μm.

TABLE 1

|  | High Thermal Expansion Coefficient Material Layer | Coefficient of Thermal Expansion (ppm/° C.) | Appearance after Firing | Flexural Strength/ Mpa |
| --- | --- | --- | --- | --- |
| Comparative Example | No | 10.8 | ⊙ | 880 |
| Example 1 | LSCF | 17.0 | warped | 950 |
| Example 2 | LSM1 | 13.5 | ⊙ | 1050 |

TABLE 1-continued

|  | High Thermal Expansion Coefficient Material Layer | Coefficient of Thermal Expansion (ppm/° C.) | Appearance after Firing | Flexural Strength/ Mpa |
| --- | --- | --- | --- | --- |
| Example 3 | LSM2 | 12.9 | ⊙ | 1020 |
| Example 4 | LSM3 | 12.5 | ⊙ | 1000 |
| Example 5 | GDC | 12.0 | ⊙ | 990 |

Here are details of the compositions of LSCF, LSM1, LSM2, LSM3, and GDC which indicating types of the high-thermal-expansion-coefficient material layer in Table 1.

LSCF=$La_{0.8}$—$Sr_{0.2}$—$Co_{0.2}$—$Fe_{0.803}$

LSM1: $La_{0.7}Sr_{0.3}MnO_3$

LSM2: $La_{0.8}Sr_{0.2}MnO_3$

LSM3: $La_{0.9}Sr_{0.1}MnO_3$

GDC: $GD_{0.2}$-$Ce_{0.802}$

It is to be noted that the numbers indicate molar ratios.

As is clear from Table 1, it is determined that the flexural strength can be effectively enhanced according to Examples 1 to 5, as compared with the separator according to Comparative Example, that is, the separator including no high-thermal-expansion-coefficient material layer. This is believed to be because breakages are suppressed by compressive stress from the high-thermal-expansion-coefficient material layer.

In addition, in Example 1, the appearance after the firing has slight warpage found, because of the large difference in coefficient of thermal expansion: 17.0–10.8=6.2. However, even in this case, the flexural strength was 950 MPa, which is significantly higher 880 Pa in Comparative Example.

In addition, it is determined that the appearance is excellent while the flexural strength is also high according to Examples 2 to 5 with the difference in coefficient of thermal expansion of 3 ppm or less Experimental Example 2

Evaluation on Fuel Cell Stack

The separators according to Examples 2 to 4 and Comparative Example, prepared in Experimental Example 1, were used to prepare fuel stacks. More specifically, five cells of fuel cells as shown in FIG. 1 were stacked to obtain a fuel cell stack. In this regard, each fuel cell of the fuel cells was used as follows.

Solid Oxide Electrolyte Layer: composed of YSZ; 20 to 100 μm in thickness

Air Electrode: composed of LSCF; 20 to 100 μm in thickness

Fuel Electrode: composed of Ni/YSZ; 20 to 100 μm in thickness

First and Second Separators: The flow path formation members were formed from 3YSZ to have a thickness adjusted to 300 to 1000 μm. The separators according to the example or comparative example as described above were used for the first and second separator bodies.

The relationship between the maximum internal temperature difference ΔT and cracking was evaluated while measuring the internal temperature of the fuel cell stack obtained in the way mentioned above. More specifically, electric current was applied to the air electrode and fuel electrode of the fuel cell stack to increase the internal temperature. In the case of the cell of the fuel cell in a planar view, the temperatures of nine regions located in a matrix were each measured. Then, among the temperatures at the nine points, the difference in temperature between the two regions with the largest temperature difference was regarded as the maximum temperature difference ΔT. Then, the current density was increased, and the current density and the maximum temperature difference ΔT were obtained when the cell of the fuel cell was cracked, and regarded as a limited current density and a limit ΔT.

The results are shown in Table 2 below.

TABLE 2

|  | High Thermal Expansion Coefficient Material Layer | Limited Current Density (Unit: A/cm$^2$) | Limit ΔT |
| --- | --- | --- | --- |
| Comparative Example | No | 0.7 | 95° C. |
| Example 2 | LSM1 | 0.9 | 130° C. |
| Example 3 | LSM2 | 0.8 | 120° C. |
| Example 4 | LSM3 | 0.85 | 120° C. |

As is clear from Table 2, in Comparative Example, the limit ΔT also remained at 95° C. with a low limited current density of 0.7 A/cm2. In contrast, in Examples 2 to 4, it is determined that the limit ΔT is also large and 120° C. or more while the limited current density is higher than that in Comparative Example. Accordingly, it is determined that the cells are unlikely to be cracked until reaching a high current density. This is believed to be because the strength of the separators is enhanced by the high-thermal-expansion coefficient material layers.

DESCRIPTION OF REFERENCE SYMBOLS 1 fuel cell
10 first separator
11 first separator body
11a ceramic layer
11b high-thermal-expansion-coefficient material layer
11c via hole electrode
12 first flow path formation member
12a oxidant gas flow path
12c1 via hole electrode
12c separation part
30 power generation element
31 solid oxide electrolyte layer
32 air electrode layer
32a air electrode
33 fuel electrode layer
33a fuel electrode
50 second separator
51 second separator body
51a ceramic layer
51b high-thermal-expansion-coefficient material layer
51c via hole electrode
52 second flow path formation member
52a fuel gas flow path
52c1 via hole electrode
52c separation part
61 slit
62 slit
71 fuel cell stack
72 cell of fuel cell
73 separator
73a ceramic layer
73b, 73c high-thermal-expansion-coefficient material layer
81 ceramic substrate for electrochemical element
82 ceramic layer
83 high-thermal-expansion-coefficient material layer
83a void
91 solid oxide fuel cell
91 fuel cell
91a flow path
92 air electrode
93 solid oxide electrolyte layer
94 fuel electrode
95 interconnector
95a ceramic layer
95b high-thermal-expansion-coefficient material layer

The invention claimed is:

1. A ceramic substrate for an electrochemical element, the ceramic substrate comprising:
a ceramic layer;
a high-thermal-expansion-coefficient material layer on a surface of the ceramic layer, the high-thermal-expansion-coefficient material layer comprises a ceramic material containing at least one of a lanthanum-manganite material, a lanthanum-cobaltite material, and a gadolinium doped ceria material as a main component thereof, having a higher coefficient of thermal expansion than the ceramic layer and applying compressive stress to the ceramic layer; and
via hole electrodes penetrating the ceramic layer and the high-thermal-expansion-coefficient material layer.

2. The ceramic substrate for an electrochemical element according to claim 1, wherein a difference in the coefficient of thermal expansion between the ceramic layer and the high-thermal-expansion-coefficient material layer is 3 ppm or less.

3. The ceramic substrate for an electrochemical element according to claim 1, wherein the ceramic material contains the lanthanum manganite material as the main component thereof.

4. The ceramic substrate for an electrochemical element according to claim 1, wherein the high-thermal-expansion-coefficient material layer is a porous body.

5. The ceramic substrate for an electrochemical element according to claim 4, wherein a porosity of the porous body is 20% or more.

6. The ceramic substrate for an electrochemical element according to claim 1, wherein the ceramic substrate for the electrochemical element is configured as a separator of the electrochemical element.

7. The ceramic substrate for an electrochemical element according to claim 1, wherein the ceramic layer is in the form of a sheet.

8. The ceramic substrate for an electrochemical element according to claim 1, wherein the ceramic layer is stabilized zirconia or partially stabilized zirconia.

9. The ceramic substrate for an electrochemical element according to claim 8, wherein the ceramic material contains the lanthanum manganite material as the main component thereof.

10. The ceramic substrate for an electrochemical element according to claim 1, wherein the high-thermal-expansion-coefficient material layer is a first high-thermal-expansion-coefficient material layer on a first surface of the ceramic layer, and the ceramic substrate for an electrochemical element further comprises a second high-thermal-expansion-coefficient material layer on a second surface of the ceramic layer opposite the first surface.

11. The ceramic substrate for an electrochemical element according to claim 1, wherein the high-thermal-expansioncoefficient material layer applies the compressive stress to the ceramic layer in a planar direction of the ceramic layer.

12. A fuel cell comprising:
a separator; and
a cell of a fuel cell,
wherein the separator comprises the ceramic substrate for an electrochemical element according to claim 1.

13. A fuel cell stack comprising:
a plurality of stacked cells; and
a separator disposed between the adjacent cells of the plurality of stacked cells,
wherein the separator comprises the ceramic substrate for an electrochemical element according to claim 1.

14. A method for manufacturing a ceramic substrate for an electrochemical element, the method comprising:
preparing a ceramic layer;
integrating, on a surface of the ceramic layer, a high-thermal-expansion-coefficient material layer comprising a ceramic material containing at least one of a lanthanum-manganite material, a lanthanum-cobaltite material, and a gadolinium doped ceria material as a main component thereof and that has a higher coefficient of thermal expansion than the ceramic layer so that compressive stress is applied to the ceramic layer; and
forming via hole electrodes that penetrate the ceramic layer and the high-thermal-expansion-coefficient material layer.

15. The method for manufacturing a ceramic substrate for an electrochemical element according to claim 14, wherein the high-thermal-expansion-coefficient material layer comprises a ceramic that has, after firing to integrate the high-thermal-expansion-coefficient material layer on the ceramic layer, a higher coefficient of thermal expansion than the ceramic layer.

16. The method for manufacturing a ceramic substrate for an electrochemical element according to claim 15, wherein a difference in the coefficient of thermal expansion between the ceramic layer and the high-thermal-expansion-coefficient material layer is 3 ppm or less.

17. The method for manufacturing a ceramic substrate for an electrochemical element according to claim 14, wherein the ceramic material contains the lanthanum manganite material as the main component thereof.

18. The method for manufacturing a ceramic substrate for an electrochemical element according to claim 14, wherein the ceramic layer is stabilized zirconia or partially stabilized zirconia.

19. The method for manufacturing a ceramic substrate for an electrochemical element according to claim 18, wherein the ceramic material contains the lanthanum manganite material as the main component thereof.

20. The method for manufacturing a ceramic substrate for an electrochemical element according to claim 14, wherein the high-thermal-expansion-coefficient material layer applies the compressive stress to the ceramic layer in a planar direction of the ceramic layer.

\* \* \* \* \*